US012711295B2

(12) United States Patent
Serrano et al.

(10) Patent No.: US 12,711,295 B2
(45) Date of Patent: Aug. 18, 2026

(54) USING MACHINE VISION TO SOLVE INDUSTRIAL BOOLEAN SATISFIABILITY (SAT) PROBLEMS

(71) Applicant: HRL Laboratories, LLC, Malibu, CA (US)

(72) Inventors: Christopher R. Serrano, Whittier, CA (US); Michael A. Warren, Northridge, CA (US); Aleksey Nogin, Fresno, CA (US); Alexei Kopylov, Burbank, CA (US)

(73) Assignee: HRL Laboratories, LLC, Malibu, CA (US)

( * ) Notice: Subject to any disclaimer, the term of this patent is extended or adjusted under 35 U.S.C. 154(b) by 763 days.

(21) Appl. No.: 18/181,200

(22) Filed: Mar. 9, 2023

(65) Prior Publication Data

US 2024/0303404 A1 Sep. 12, 2024

(51) Int. Cl.
*G06F 30/3323* (2020.01)
*G06F 30/27* (2020.01)
(Continued)

(52) U.S. Cl.
CPC .......... *G06F 30/3323* (2020.01); *G06F 30/27* (2020.01); *G06F 30/3308* (2020.01); *G06F 2111/04* (2020.01)

(58) Field of Classification Search
CPC .. G06F 30/3323; G06F 30/27; G06F 30/3308; G06F 2111/04
(Continued)

(56) References Cited

U.S. PATENT DOCUMENTS 6,131,078 A * 10/2000 Plaisted .............. G06F 30/3323 703/2
6,728,665 B1 * 4/2004 Gupta ................. G06F 30/3323 703/2
(Continued)

FOREIGN PATENT DOCUMENTS

CN 112507656 A * 3/2021 ........... G06F 30/398
EP 1681633 A2 * 7/2006 ......... G06F 30/3323
(Continued)

OTHER PUBLICATIONS

Alyahya et al., "One the Structure of the Boolean Satisfiability Problem: A Survey", ACM Computing Surevy, 55, 3, Article 46, Mar. 2022, 34 pages. (Year: 2022).*
(Continued)

*Primary Examiner* — Phallaka Kik
(74) *Attorney, Agent, or Firm* — Wheatstone IP Law Corporation; Milad G. Shara

(57) ABSTRACT

A computer system is disclosed for processing industrial Boolean satisfiability (SAT) problems. A computer implemented SAT image encoder is configured to encode a runtime industrial SAT problem into a pixelated problem image comprising a plurality of rows, wherein the runtime industrial SAT problem comprises a plurality of clauses and each row of the pixelated problem image represents a corresponding one of the clauses. A computer implemented clause embedding module is configured to encode each row of the pixelated problem image into a corresponding vector, and a computer implemented vector encoder is configured to encode the vectors into an output indicating whether the runtime industrial SAT problem is satisfiable or unsatisfiable.

19 Claims, 4 Drawing Sheets

(51) Int. Cl.
*G06F 30/3308* (2020.01)
*G06F 111/04* (2020.01)

(58) Field of Classification Search
USPC ................. 716/106, 111, 136; 703/2, 14, 17
See application file for complete search history.

(56) References Cited

U.S. PATENT DOCUMENTS

| | | | | |
|---|---|---|---|---|
| 7,062,729 | B2 * | 6/2006 | Gray | G06F 30/39 716/135 |
| 7,519,931 | B1 * | 4/2009 | Shacham | G06F 30/3323 716/100 |
| 7,596,770 | B1 * | 9/2009 | Kuehlmann | G06F 30/3312 716/136 |
| 7,610,570 | B1 * | 10/2009 | Goldberg | G06F 30/3323 716/100 |
| 2002/0053064 | A1 * | 5/2002 | Gupta | G06F 30/3323 703/2 |
| 2002/0178424 | A1 * | 11/2002 | Gupta | G06F 30/3323 703/27 |
| 2003/0225552 | A1 * | 12/2003 | Ganai | G06F 30/3323 703/2 |
| 2004/0236545 | A1 * | 11/2004 | Arroyo-Figueroa | G06F 17/11 703/2 |
| 2005/0240885 | A1 * | 10/2005 | Ganai | G06F 30/3323 703/2 |
| 2006/0064661 | A1 * | 3/2006 | Gray | G06F 30/39 716/122 |
| 2009/0254505 | A1 * | 10/2009 | Davis | G06N 5/04 706/46 |
| 2011/0010317 | A1 * | 1/2011 | Ito | G06N 20/00 706/12 |
| 2018/0107825 | A1 * | 4/2018 | Darbari | G06F 21/572 |
| 2022/0044097 | A1 * | 2/2022 | Si | G06N 3/047 |
| 2023/0410903 | A1 * | 12/2023 | Pedretti | H03K 19/20 |

FOREIGN PATENT DOCUMENTS

| | | | | |
|---|---|---|---|---|
| JP | 2003022261 A | * | 1/2003 | G06F 30/3323 |
| JP | 2006202288 A | * | 8/2006 | G06F 17/11 |
| WO | WO-0068827 A1 | * | 11/2000 | G06F 17/10 |

OTHER PUBLICATIONS

"Encoding Problems in Boolean Satifiability", https://ozanerdem.github.io/jekyll/update/2019/11/17/representation-in-sat.html#:~:text=The%20Boolean%20Satisfiability%20Problem%20(SAT, Mar. 17, 2019, 13 pages. (Year: 2019).*

Pradella et al., "A SAT-based parser and completer for pictures specified by tiling", Journal of the Pattern Recognition Society, vol. 41, 2008, pp. 555-566. (Year: 2008).*

Fang et al., Chinese Patent Document No. CN-114091392-A, published Feb. 25, 2022, 4 pages including abstract, claims and 1 drawing. (Year: 2022).*

Prince, "Tutorial #9, SAT Solvers I: Introduction and applications", RBC Borealis, Nov. 10, 2020, 25 pages. (Year: 2020).*

Djamegni, "The Boolean Satisfiablity Problem: an overview of solving techniques and applications", University of Dschang, May 19, 2021, 63 pages. (Year: 2021).*

A. Dosovitskiy et al.; "An Image is Worth 16×16 Words: Transformers for Image Recognition at Scale," ICLR, Jun. 2021; 22 pp.

S. Polu et al.; "Generative Language Modeling for Automated Theorem Proving," ArXiv Preprint, Sep. 2020; 20 pp.

A. Paszke et al.; "PyTorch: An Imperative Style, High Performance Deep Learning Library," NeurIPS, Dec. 2019; 12 pp.

D. Selsam et al.; "Guiding High-Performance SAT Solvers with Unsat-Core Predictions," International Conference on Theory and Applications of Satisfiability Testing, Jul. 2019; 19 pp.

N. Megill et al.; "Metamath: A Computer Language for Mathematical Proofs," Jun. 2019; 247 pp.

D. Selsam et al.; "Learning a SAT Solver from Single-Bit Supervision," ICLR, Mar. 12, 2019; 11 pp.

A. Radford et al.; "Language Models are Unsupervised Multitask Learners," [Online], Available: https://openai.com/blog/better-language models/; OpenAI blog 1(8), Feb. 14, 2019; 24 pp.

S. Gilmer et al.; "Neural Message Passing for Quantum Chemistry," PMLR 70, 2017; 14 pp.

A. Vaswani et al.; "Attention is All You Need," NeurIPS, 2017; 15 pp.

A. Loreggia et al.; "Deep Learning for Algorithm Portfolios," Association for the Advancement of Artificial Intelligence (www.aaai.org), 2015; pp. 1-7.

C. Ansotegui et al.; "Towards Industrial-Like Random SAT Instances," IJCAI, 2009; pp. 387-392.

L. De Moura et al.; "Z3: An Efficient SMT Solver," TACAS, 2008; pp. 337-340.

D. Devlin et al.; "Satisfiability as a Classification Problem," Proceedings of the 19th Irish Conference on Artificial Intelligence and Cognitive Science, 2008; 10 pp.

L. Xu et al.; "Satzilla: The Design and Analysis of an Algorithm Portfolio for SAT," Principles and Practice of Constraint Programming—(CP-07), Berlin, Springer Berlin, 2007; pp. 712-727.

S. C. Brailsford et al.; "Constraint Satisfaction Problems: Algorithms and Applications," European Journal of Operational Research, vol. 119, No. 3, 1999; pp. 557-581.

R. M. Karp; "Reducibility Among Combinatorial Problems," Complexity of Computer Computations, 1972; pp. 85-103.

S. A. Cook, "The Complexity of Theorem-Proving Procedures," in STOC, 1971; pp. 151-158.

* cited by examiner

| SAT Problems $S_1$ to $S_P$ | SAT Label (1 or 0) | SAT Problem Images $\{\{-1,0,1\}^D\}^N$ |
|---|---|---|
| SAT Problem $S_1$ | 0 | Image $I_1 = \{\{-1,0,1\}^D\}^N$ |
| SAT Problem $S_2$ | 1 | Image $I_2 = \{\{-1,0,1\}^D\}^N$ |
| ⋮ | ⋮ | ⋮ |
| SAT Problem $S_P$ | 1 | Image $I_P = \{\{-1,0,1\}^D\}^N$ |

USING MACHINE VISION TO SOLVE INDUSTRIAL BOOLEAN SATISFIABILITY (SAT) PROBLEMS

TECHNICAL FIELD

This specification is related to solving Boolean satisfiability (SAT) problems.

BACKGROUND

Boolean satisfiability (SAT) solving is commonly used to solve Constraint Satisfaction Problems to find solutions for combinatorial problems in industrial applications, such as scheduling and timetabling (e.g., supply chain management logistics, manufacturing and networking, critical path analysis, floor planning, resource allocation, routing, software verification, and cyber-physical systems verification). SAT solving may be formulated as a machine learning classification problem, as described in D. Devlin and B. O'Sullivan, "Satisfiability as a Classification Problem," in PROC. OF THE 19TH IRISH CONE ON ARTIFICIAL INTELLIGENCE AND COGNITIVE SCIENCE, 2008.

DETAILED DESCRIPTION

Figures 1A, 1B:
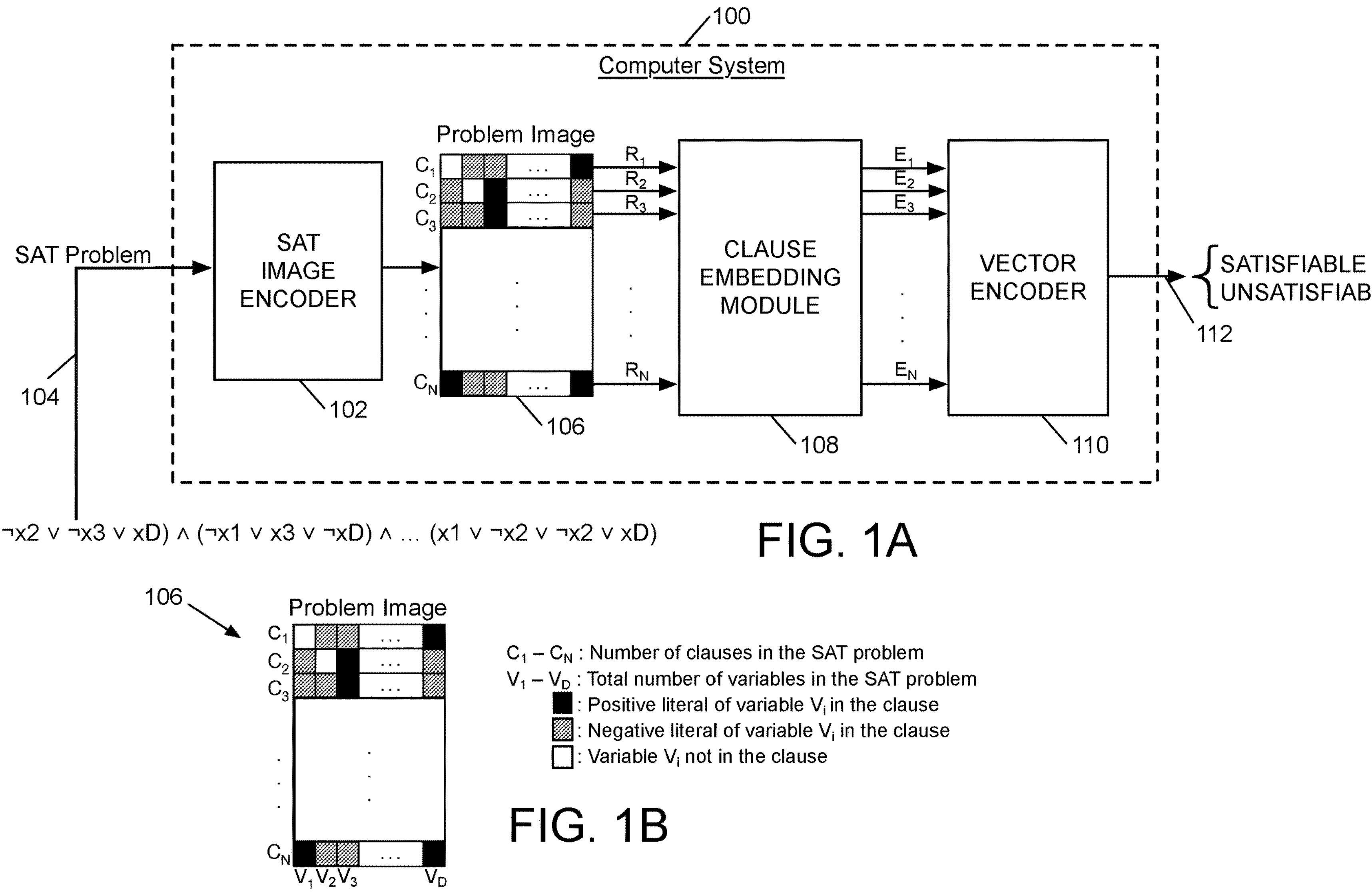
FIG. 1A shows a computer system according to an embodiment for encoding a runtime industrial Boolean satisfiability (SAT) problem into a pixelated problem image, encoding each row of the problem image into a vector, and encoding the vectors into an output indicating whether the runtime industrial SAT problem is satisfiable or unsatisfiable.
FIG. 1B shows an embodiment for encoding an industrial SAT problem into a pixelated problem image.

FIG. 1A shows a computer system 100 according to an embodiment for processing industrial SAT problems. A computer implemented SAT image encoder 102 is configured to encode a runtime industrial SAT problem 104 into a pixelated problem image 106 comprising a plurality of rows, wherein the runtime industrial SAT problem 104 comprises a plurality of clauses and each row of the pixelated problem image 106 represents a corresponding one of the clauses. A computer implemented clause embedding module 108 is configured to encode each row of the pixelated problem image into a corresponding vector $E_i$, and a computer implemented vector encoder 110 is configured to encode the vectors $E_1$-$E_N$ into an output 112 indicating whether the runtime industrial SAT problem 104 is satisfiable or unsatisfiable.

SAT problems are Conjunctive Normal Form (CNF) defining a Boolean formula as a conjunction of clauses, where each clause is composed of a disjunction of literals. FIG. 1A shows an example of a SAT problem:

$$(\neg x2 \vee \neg x3 \vee xD) \wedge (\neg x1 \vee x3 \vee \neg xD) \wedge \ldots (x1 \vee \neg x2 \vee \neg x2 \vee xD)$$

where x[i] are the variables $V_1$-$V_D$ which can take on a positive or negative value (e.g., 0 or 1). In this example SAT problem, ¬x2 is considered a negative literal of variable $V_2$, and x3 is considered a positive literal of variable $V_3$. The above example shows three clauses (e.g., (¬x2∧¬x3∧xD)) of an industrial SAT problem which may contain any N number of clauses, where each clause may comprise any number of variables out of D total variables. The SAT problem is considered satisfiable if a value (e.g., 0 or 1) can be assigned to each variable such that all of the clauses evaluate to true (otherwise the SAT problem is considered unsatisfiable).

The embodiments of the present invention involve a particular class of SAT problems referred to as industrial SAT problems related to real world industrial applications. Examples of industrial SAT problems include supply chain management logistics, manufacturing and networking, critical path analysis, floor planning, resource allocation, routing, software verification, or cyber-physical systems verification. It is well understood by those skilled in the art how to transform an industrial problem into a runtime industrial SAT problem which can be processed by the computer system 100 of FIG. 1A.

In the embodiments of the present invention, a runtime industrial SAT problem is encoded into a pixelated problem image which is processed using a suitable machine vision network in order to classify the runtime industrial SAT problem as satisfiable or unsatisfiable. In the embodiment of FIG. 1A, each clause of the industrial SAT problem (represented by a corresponding row of the pixelated problem image 106) is encoded into a corresponding vector $E_i$ by an embedding module 108 (wherein the concept of "learned embeddings" is well understood by those skilled in the art). The vector encoder 110 is then used to encode the vectors $E_1$-$E_N$ into the output 112 indicating whether the runtime industrial SAT problem 104 is satisfiable or unsatisfiable. Any suitable vector encoder 110 may be employed in the embodiments, such as any suitable machine learning network comprising one or more machine learning components (e.g., multilayer perceptron (MLP) neural network, convolutional neural network (CNN), recurrent neural network (RNN), long-short-term memory (LSTM) neural network, attention network, etc.).

The runtime industrial SAT problem 104 of FIG. 1A may be encoded into the pixelated problem image 106 using any suitable encoding scheme. In an example shown in FIG. 1B, each row of the pixelated problem image comprises $V_D$ pixels which represents the total number of variables in the industrial SAT problem (i.e., there are $V_1$-$V_D$ pixels in each row as shown in FIG. 1B). Each pixel in a row is assigned a weight (corresponding to a particular grey-scale shading in FIG. 1B) including a first weight (black box) indicating a positive literal of the corresponding variable, a second weight (grey box) indicating a negative literal of the corresponding variable, and a third weight (white box) indicating the variable is not in the corresponding clause. Any suitable weight may be assigned to each pixel, such as a weight selected from the set [+1, 0, −1] representing a positive literal, missing variable, or negative literal, respectively.

One benefit of the image encoding technique in the embodiment of FIG. 1B is that the resulting pixelated problem image is permutation invariant. For example, the clause ($x1 \wedge \neg x3$) is equivalent to the permutated version of the clause ($\neg x3 \wedge x1$); however, in the embodiment of FIG. 1B both of these clauses will be encoded into the same pixelated representation in the corresponding row of the pixelated problem image. In one embodiment, encoding an industrial SAT problem into a pixelated problem image using a permutation invariant technique such as in FIG. 1B enables the use of machine vision networks that may not be permutation invariant (e.g., a convolutional neural network (CNN)) in order to solve for satisfiability of the industrial SAT problem.

Referring again to FIG. 1A, any suitable vector encoder 110 may be used to encode the vectors $E_1$-$E_N$ into an output 112 indicating whether the runtime industrial SAT problem 104 is satisfiable or unsatisfiable. In one embodiment, the vector encoder 110 comprises any suitable self-attention-based encoder such as a transformer. Transformer encoders are well understood by those skilled in the art, such as the example vision transformer described in A. Dosovitskiy, L. Beyer, A. Kolesnikov, D. Weissenborn, X. Zhai, T. Unterthiner, M. Dehghani, M. Minderer, G. Heigold, S. Gelly, J. Uszkoreit and N. Houlsby, "*An Image is Worth* 16×16 *Words: Transformers for Image Recognition at Scale*," in ICLR, 2020.

Figure 2:
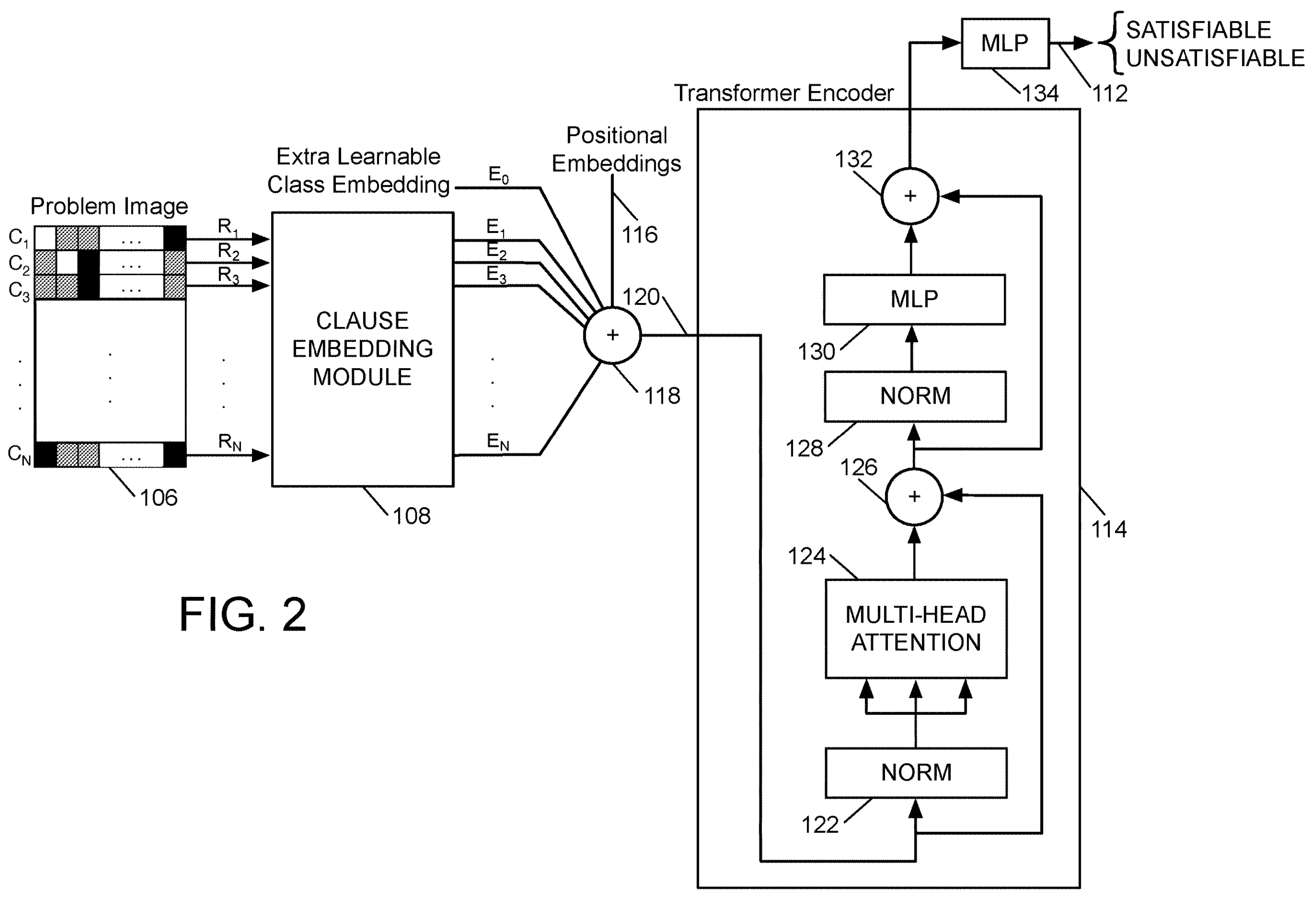
FIG. 2 shows an embodiment wherein the vectors of the pixelated problem image are encoded using a self-attention-based transformer encoder.

FIG. 2 shows an example of a vector encoder 110 comprising a transformer encoder 114 wherein an extra learnable class embedding $E_0$ is concatenated to the vectors $E_1$-$E_N$ output by the embedding module 108, and a positional embedding 116 is added element wise to the vectors $E_0$-$E_N$ (at adder 118). The resulting sequence of vectors 120 is fed into at least one transformer encoder 114 comprising a first layer normalization 122, a multi-head self attention network 124, a first residual connection 126, a second layer normalization 128, a multi-layer perceptron (MLP) network 130, and a second residual connection 132. A classification head in the form of a MLP network 134 which corresponds to the class embedding $E_0$ processes the output of the transformer encoder 114 to generate a probability for each class (satisfiable or unsatisfiable). Each component of the computer system shown in FIG. 2 may be implemented with any of a number of machine learning software tools available to those skilled in the art, such as PyTorch, TensorFlow, etc.

Although the embodiment of FIG. 1A describes a particular machine vision network for solving the satisfiability of an industrial SAT problem represented as a corresponding pixelated problem image, other embodiments may employ any other suitable machine vision network, such as a machine vision network comprising a convolutional neural network (CNN) or a recurrent neural network (RNN).

Figures 3A, 3B:
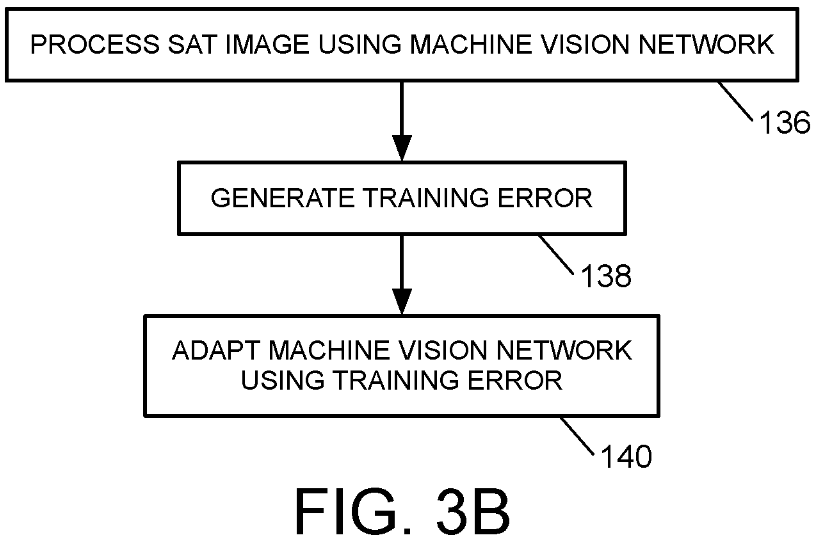
FIG. 3A shows a ground truth table of industrial SAT problems used to train a machine vision network according to an embodiment.
FIG. 3B is a flow diagram according to an embodiment for training the computer system of FIG. 1A using the ground truth table of FIG. 3A.

In one embodiment, the machine vision network is trained using a ground truth dataset such as shown in FIG. 3A. A sufficient P number of training industrial SAT problems are first generated such as described in C. Ansotegui, M. L. Bonet and J. Levy, "Towards Industrial-Like Random SAT Instances," in *IJCAI,* 2009. A solution (satisfiable/unsatisfiable) for each training industrial SAT problem is found using any suitable software tool, such as with Microsoft's Z3 described in L. D. Moura and N. Bjorner, "Z3: An Efficient SMT Solver," in *TACAS,* 2008. The middle column of FIG. 3A represents the corresponding SAT label where "1" indicates the industrial SAT problem is satisfiable and a "0" indicates the industrial SAT problem is unsatisfiable. Each training industrial SAT problem is encoded by the SAT image encoder 102 of FIG. 1 to generate a correspond problem image as shown in the third column of FIG. 3A.

FIG. 3B is a flow diagram according to an embodiment for training a suitable machine vision network, such as the embedding module 108 and vector encoder 110 of FIG. 1A, using the dataset of FIG. 3A. One of the SAT problem images of FIG. 3A is processed using the machine vision network (block 136), and a training error is generated (block 138) based on an error between the known solution to the SAT problem (middle column of FIG. 3) and the solution generated by the machine vision network. The machine vision network is then adapted (block 140) based on the training error using any suitable technique, such as gradient decent using backpropagation. Once training of the machine vision network is considered complete (e.g., once the training error falls below a predetermined threshold), the machine vision network may be tested for accuracy using a subset of the dataset of FIG. 3A. For example, a number of the SAT image problems not used for training may be processed by the trained machine vision network in order to measure the error between the solution output by the network and the known solution from the ground truth data set (middle column of FIG. 3A).

Figure 4:
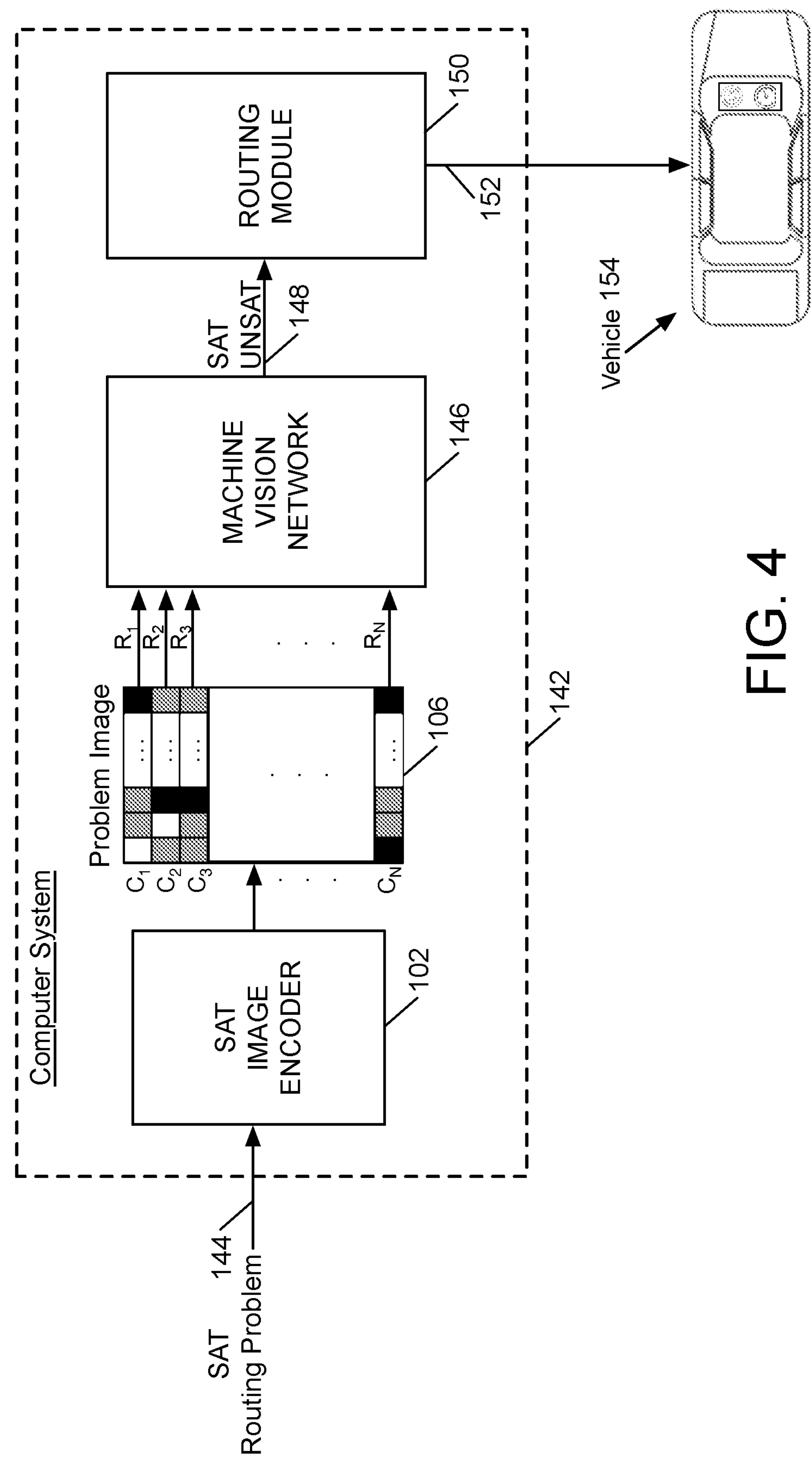
FIG. 4 shows an embodiment wherein a SAT image encoder encodes a runtime SAT routing problem into a pixelated problem image, and a machine vision network encodes the pixelated problem image into an output indicating whether the runtime SAT routing problem is satisfiable or unsatisfiable which is used by a routing module to route one or more vehicles.

FIG. 4 shows an embodiment of a computer system 142 for processing an industrial SAT problem in the form of routing one or more vehicles based on a number of predetermined constraints. The computer system 142 comprises the SAT image encoder 102 described for encoding the SAT routing problem 144 into a pixelated problem image 106. The pixelated problem image 106 is processed by a suitable machine vision network 146 which generates an output 148 indicating whether the SAT routing problem 144 is satisfiable or unsatisfiable. The output 148 of the machine vision network 146 is processed by a suitable routing module 150 which in one embodiment finds a solution to the SAT routing problem when the machine vision network 146 indicates the SAT routing problem is satisfiable. The routing module 150 generates a control signal based on the solution to the SAT routing problem which is used to control a vehicle 154 so that it follows the corresponding target route (e.g., by programming the target route into a computer implemented GPS navigation system and/or by programming a computer implemented vehicle guidance system). The vehicle shown in the embodiment of FIG. 4 is an automobile; however, any suitable vehicle may be controlled using the machine vision network embodiments disclosed herein, such as aircraft, drones, missiles, robots, etc.

In one embodiment, the computer system in the above described embodiments (e.g., computer system 100 of FIG. 1A) comprises one or more processors configured to perform calculations, processes, operations, and/or functions associated with a program or algorithm. The processes and steps in the example embodiments may be instructions (e.g., software program) that reside within a non-transitory computer readable memory executed by the one or more processors of computer system. When executed, these instructions cause the computer system to perform specific actions and exhibit specific behavior for the example embodiments disclosed herein. The processors may include one or more of a single processor or a parallel processor, an application-specific integrated circuit (ASIC), programmable logic array (PLA), complex programmable logic device (CPLD), or a field programmable gate array (FPGA).

The computer system may be configured to utilize one or more data storage units such as a volatile memory unit (e.g., random access memory or RAM such as static RAM, dynamic RAM, etc.) coupled with address/data bus. Also, the computer system may include a non-volatile memory units (e.g., read-only memory ("ROM"), programmable ROM ("PROM"), erasable programmable ROM ("EPROM"), electrically erasable programmable ROM "EEPROM"), flash memory, etc.) coupled with an address/data bus. A non-volatile memory unit may be configured to store static information and instructions for a processor. Alternatively, the computer system may execute instructions retrieved from an online data storage unit such as in "Cloud" computing.

The computer system may include one or more interfaces are configured to enable the computer system to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

The computer system may include an input device configured to communicate information and command selections to a processor. Input device may be an alphanumeric input device, such as a keyboard, that may include alphanumeric and/or function keys. The computer system may further include a cursor control device configured to communicate user input information and/or command selections to a processor. The cursor control device may be implemented using a device such as a mouse, a track-ball, a track-pad, an optical tracking device, or a touch screen. The cursor control device may be directed and/or activated via input from an input device, such as in response to the use of special keys and key sequence commands associated with the input device. Alternatively, the cursor control device may be configured to be directed or guided by voice commands.

The processes and steps for the example may be stored as computer-readable instructions on a compatible non-transitory computer-readable medium of a computer program product. Computer-readable instructions include a set of operations to be performed on a computer, and may represent pieces of a whole program or individual, separable, software modules. For example, computer-readable instructions include computer program code (source or object code) and "hard-coded" electronics (i.e. computer operations coded into a computer chip). The computer-readable instructions may be stored on any non-transitory computer-readable medium, such as in the memory of a computer or on external storage devices. The instructions are encoded on a non-transitory computer-readable medium.

A number of example embodiments have been described. Nevertheless, it will be understood that various modifications may be made without departing from the spirit and scope of the devices and methods described herein.

What is claimed is:

1. A computer system for processing industrial Boolean satisfiability (SAT) problems comprising:

a computer implemented SAT image encoder configured to encode a runtime industrial SAT problem into a pixelated problem image comprising a plurality of rows, wherein the runtime industrial SAT problem comprises a plurality of clauses and each row of the pixelated problem image represents a corresponding one of the clauses;

a computer implemented clause embedding module configured to encode each row of the pixelated problem image into a corresponding vector; and a computer implemented vector encoder configured to encode the vectors into an output indicating whether the runtime industrial SAT problem is satisfiable or unsatisfiable.

2. The computer system for processing industrial Boolean satisfiability (SAT) problems as recited in claim 1, wherein the pixelated problem image is permutation invariant.

3. The computer system for processing industrial Boolean satisfiability (SAT) problems as recited in claim 1, wherein the vector encoder comprises a computer implemented self-attention-based encoder.

4. The computer system for processing industrial Boolean satisfiability (SAT) problems as recited in claim 3, wherein the self-attention-based encoder comprises a computer implemented transformer.

5. The computer system for processing industrial Boolean satisfiability (SAT) problems as recited in claim 1, wherein:

each row of the pixelated problem image comprises D pixels where D is a total number of variables in the runtime industrial SAT problem; and each pixel is configured with one of a plurality of weights, including a first weight indicating a positive literal of the corresponding variable, a second weight indicating a negative literal of the corresponding variable, and a third weight indicating the variable is not in the corresponding clause.

6. The computer system for processing industrial Boolean satisfiability (SAT) problems as recited in claim 5, wherein each clause comprises M variables out of the D total variables such that each row comprises D pixels each comprising one of the first weight or the second weight and the remaining pixels in the row each comprising the third weight.

7. The computer system for processing industrial Boolean satisfiability (SAT) problems as recited in claim 1, wherein the runtime industrial SAT problem is one of supply chain management logistics, manufacturing and networking, critical path analysis, floor planning, resource allocation, routing, software verification, or cyber-physical systems verification.

8. A computer system for processing industrial Boolean satisfiability (SAT) problems comprising:

a computer implemented SAT image encoder configured to encode an industrial SAT problem comprising a plurality of clauses into a pixelated problem image comprising a plurality of rows, wherein:

each row of the pixelated problem image represents a corresponding one of the clauses;

each row of the pixelated problem image comprises D pixels where D is a total number of variables in the industrial SAT problem; and each pixel is configured with one of a plurality of weights, including a first weight indicating a positive literal of the corresponding variable, a second weight indicating a negative literal of the corresponding variable, and a third weight indicating the variable is not in the corresponding clause;

a computer implemented clause embedding module configured to encode each row of the pixelated problem image into a corresponding vector; and a computer implemented vector encoder configured to encode the vectors into an output indicating whether the industrial SAT problem is satisfiable or unsatisfiable.

9. The computer implemented system for processing industrial Boolean satisfiability (SAT) problems as recited in claim 8, wherein each clause comprises M variables out of the D total variables such that each row comprises D pixels each comprising one of the first weight or the second weight and the remaining pixels in the row each comprising the third weight.

10. The computer system for processing industrial Boolean satisfiability (SAT) problems as recited in claim 8, wherein the vector encoder comprises a computer implemented self-attention-based encoder.

11. The computer system for processing industrial Boolean satisfiability (SAT) problems as recited in claim 10, wherein the self-attention-based encoder comprises a computer implemented transformer.

12. The computer system for processing industrial Boolean satisfiability (SAT) problems as recited in claim 8, wherein the industrial SAT problem is one of supply chain management logistics, manufacturing and networking, critical path analysis, floor planning, resource allocation, routing, software verification, or cyber-physical systems verification.

13. A computer implemented method of training an industrial Boolean satisfiability (SAT) problem processor, the method comprising:

using a computer to encode a training industrial SAT problem into a pixelated problem image comprising a plurality of rows, wherein the training industrial SAT problem comprises a plurality of clauses and each row of the problem image represents a corresponding one of the clauses;

using the computer to process the pixelated problem image using a computer implemented machine vision module which generates an output indicating whether the training industrial SAT problem is satisfiable or unsatisfiable;

using the computer to compare the output to a predetermined satisfiability solution of the training industrial SAT problem to generate a training error; and using the computer to adapt the machine vision module based on the training error.

14. The computer implemented method of training an industrial Boolean satisfiability (SAT) problem processor as recited in claim 13, further comprising:

using the machine vision module to encode each row of the pixelated problem image into a corresponding vector; and using the machine vision module to encode the vectors into an output indicating whether the training industrial SAT problem is satisfiable or unsatisfiable.

15. The computer implemented method of training an industrial Boolean satisfiability (SAT) problem processor as recited in claim 13, wherein the machine vision module comprises a self-attention-based encoder.

16. The computer implemented method of training an industrial Boolean satisfiability (SAT) problem processor as recited in claim 15, wherein the self-attention-based encoder comprises a computer implemented transformer.

17. The computer implemented method of training an industrial Boolean satisfiability (SAT) problem processor as recited in claim 13, wherein:

each row of the pixelated problem image comprises D pixels where D is a total number of variables in the training industrial SAT problem; and each pixel is configured with one of a plurality of weights, including a first weight indicating a positive literal of the corresponding variable, a second weight indicating a negative literal of the corresponding variable, and a third weight indicating the variable is not in the corresponding clause.

18. The computer implemented method of training an industrial Boolean satisfiability (SAT) problem processor as recited in claim 17, wherein each clause comprises M variables out of the D total variables such that each row comprises D pixels each comprising one of the first weight or the second weight and the remaining pixels in the row each comprising the third weight.

19. The computer implemented method of training an industrial Boolean satisfiability (SAT) problem processor as recited in claim 13, wherein the training industrial SAT problem is one of supply chain management logistics, manufacturing and networking, critical path analysis, floor planning, resource allocation, routing, software verification, or cyber-physical systems verification.

* * * * *